Figure 1:
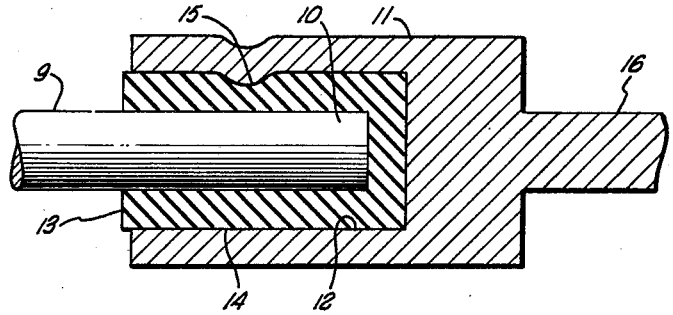

March 12, 1963  L. M. BLOM, JR., ETAL  3,080,735
INSTRUMENT SHAFT RELEASE CLUTCH
Filed March 16, 1961

INVENTORS.
EDMUND W. PITZER
LEO MARINUS BLOM, JR.
BY
Christie, Parker & Hale
ATTORNEYS.

3,080,735
INSTRUMENT SHAFT RELEASE CLUTCH
Leo M. Blom, Jr., Covina, and Edmund W. Pitzer, Monrovia, Calif., assignors to Edcliff Instruments, Monrovia, Calif., a corporation of California
Filed Mar. 16, 1961, Ser. No. 96,158
2 Claims. (Cl. 64—28)

The invention relates to a release clutch for a rotatable instrument shaft to prevent over-torquing of the shaft.

Instruments which have rotatable shafts, particularly adjustment shafts which are rotated to obtain a setting or adjustment of the instrument, have presented the problem of damage to the instrument as a result of application of too much torque to the shaft. This problem is particularly present in miniaturized instruments, such as miniaturized potentiometers, because the small size parts involved do not have great strength and are thus susceptible to rupture through application of too much torque and because the small dimensions in general present problems in providing suitable torque release mechanism. Moreover, high temperature or vibrational environments of the instrument may make certain types of release clutches impracticable.

The invention obviates the above problems by providing a torque release clutch for a rotatable instrument shaft which is economical to manufacture, readily susceptible to a high degree of miniaturization, and well suited for high temperature and vibrational environments.

The inventive apparatus includes, broadly, a cap surrounding an end of a rotatable instrument shaft in spaced relation therefrom with an insert surrounding the end of the shaft intermediate the cap and the end of the shaft and fixed to the shaft for rotation therewith. Means is provided for rotating the cap, and engaging means is provided for effecting engagement between the insert and the cap capable of transmitting a predetermined torque between the cap and the insert and slipping to permit relative rotation between the cap and the insert responsive to application of greater torque thereto.

The invention will be clearly understood from a reading of the following description in conjunction with the accompanying drawings, in which:

FIG. 1 is a longitudinal sectional view of an embodiment of the inventive apparatus.

Referring to FIG. 1, 10 designates an end of an instrument shaft 9, such as an adjustment shaft of an instrument. Shaft 9 is rotatably mounted in the instrument and, for example, may be a rotatably mounted lead screw which moves the slider contact of a potentiometer responsive to rotation of the lead screw. The end 10 of the instrument shaft may be an end projecting from an instrument panel or from the instrument proper or may be located within the instrument proper.

A generally cylindrical rigid cap 11, preferably made of metal or the like, surrounds the end 10 of shaft 9 coaxially therewith. Cap 11 defines an interior generally cylindrical recess 12 coaxial with the axis of shaft 9 and spaced from the end 10 of the shaft. Recess 12 extends to the exterior of one end of cap 11.

An insert 13 is disposed intermediate recess 12 and end 10 of shaft 9 and surrounds such end of the shaft. Insert 13 is fixed to end 9 of the shaft in conventional manner so that the insert and the shaft rotate as a unit. In the embodiment shown in FIG. 1, insert 13 is made of a semi-elastic and resiliently yieldable material which is electrically insulative, such as Nylatron G.S. or a similar graphite-filled nylon material, which defines a generally cylindrical exterior surface 14 on insert 13 which is geometrically similar to recess 12.

Engaging means is provided for effecting engagement between insert 13 and cap 11 capable of transmitting predetermined torque between the cap and the insert but slipping to permit relative rotation between the cap and the insert responsive to application of a greater torque thereto. In the embodiment shown in FIG. 1, this engaging means comprises an interference fit of predetermined frictional engagement between exterior surface 14 of insert 13 and the surface of recess 12 in cap 11 so that when insert 13 is disposed within recess 12 there is resilient compressive displacement of the insert and its exterior surface 14 is resiliently biased outwardly in frictional engagement with the surface of recess 12. Through conventional design procedures the interference fit is designed so that the magnitude of frictional engagement between insert 13 and cap 11 is capable of transmitting not more than a predetermined torque between the cap and the insert and will slip and permit relative rotation between cap 11 and insert 13 responsive to application of a greater torque thereto. As illustrated in FIG. 1, a projection 15, or interference dimple, may be provided which extends radially inwardly from the surface of recess 12 with sloping sides which converge as they extend inwardly. Projection 15, or a plurality of such projections, may be utilized to provide additional interference fit between insert 13 and cap 11 or may be utilized alone to produce the interference fit. The extent which projection 15 extends inwardly from the surface of recess 12 is selected so that the torque transmitting capability of the engagement between the projection and insert 13 is a predetermined amount, this being accomplished through conventional design procedures. The sides of projection 15 are sloped in order that there will be no damage or tearing of insert 13 when there is slipping and hence relative movement between cap 11 and insert 13. From the above it is apparent that the interference fit between exterior surface 14 of insert 13 and the surface of recess 12 is selected to provide a torque release clutch therebetween of predetermined torque transmitting ability through making exterior surface 14 of insert 13 geometrically similar to but slightly larger than the surface of recess 12, or providing projections or interference dimples such as 15, or otherwise deforming the surface of recess 12, or all three as desired.

Means is provided for rotating cap 11. As illustrated, this means is a driver shaft 16 coaxial with instrument shaft 9 and fixed to the end of cap 11 remote from shaft 9. Driver shaft 16 is so fixed to cap 11 in conventional manner. A suitable screw driver slot, drive gear, knob, wrench square, handle, or the like (not shown) may be fixed to driver shaft 16 to permit application of torque thereto in order to rotate cap 11. Depending upon the utilization of the apparatus, driver shaft 16 may be omitted and a screw driver slot, Allen wrench socket, or the like formed directly in the end of cap 11 to which driver shaft 16 is connected for rotation of the cap through manual application of torque thereto by means of a screw driver, Allen wrench, or the like coupled to the slot or socket.

We claim:
1. In a miniature instrument having a rotatable adjustment shaft, a release clutch for the shaft comprising a cap, said cap defining a generally cylindrical recess surrounding the end of the shaft coaxially therewith and in spaced relation therefrom, an insert disposed in the recess intermediate the cap and the shaft, said insert surrounding the end of the shaft and being fixed thereto for rotation therewith, the insert including resilient means defining a resiliently yieldable approximately cylindrical exterior surface which substantially mates with the surface of the recess in the cap, means for rotating the cap, and means for effecting frictional engagement between the insert and the cap capable of transmitting a predetermined torque between the cap and the insert and slipping to permit relative rotation between the cap and the insert responsive to application of a greater torque thereto, said frictional engagement means including at least one projection extending from the surface of the cylindrical recess radially inwardly a predetermined amount into the resilient means of the insert and having sides which converge as they extend radially inwardly from the surface of the recess.

2. Apparatus of claim 1 wherein the insert is electrically insulative.

References Cited in the file of this patent

UNITED STATES PATENTS

| | | |
|---|---|---|
| 508,426 | Klipstein | Nov. 14, 1893 |
| 1,126,219 | Hupp | Jan. 26, 1915 |
| 1,565,754 | Orth | Dec. 15, 1925 |
| 1,781,173 | Green | Nov. 11, 1930 |
| 1,941,061 | Thiry | Dec. 26, 1933 |
| 2,032,900 | Alger | Mar. 3, 1936 |
| 2,715,822 | Anderson | Aug. 23, 1955 |
| 2,848,884 | Maude | Aug. 26, 1958 |